(12) United States Patent
    Martin-Lopez (10) Patent No.: US 9,273,672 B2
(45) Date of Patent: Mar. 1, 2016

(54) SOLAR ENERGY COLLECTOR WITH XY OR XYZ SUN TRACKING TABLE

(71) Applicant: Fernando Ramon Martin-Lopez, Colorado Springs, CO (US)

(72) Inventor: Fernando Ramon Martin-Lopez, Colorado Springs, CO (US)

( * ) Notice: Subject to any disclaimer, the term of this patent is extended or adjusted under 35 U.S.C. 154(b) by 137 days.

(21) Appl. No.: 14/120,408

(22) Filed: May 19, 2014

(65) Prior Publication Data
    US 2015/0330369 A1    Nov. 19, 2015

(51) Int. Cl.
    *B60K 16/00*    (2006.01)
    *F01B 29/10*    (2006.01)
    *F03G 6/06*     (2006.01)
    *F24J 2/38*     (2014.01)
    *F24J 2/08*     (2006.01)
    *F24J 2/40*     (2006.01)

(52) U.S. Cl.
    CPC ................. *F03G 6/068* (2013.01); *F24J 2/085* (2013.01); *F24J 2/38* (2013.01); *F24J 2/40* (2013.01); *Y02E 10/46* (2013.01)

(58) Field of Classification Search
    CPC .............. F03G 6/068; F24J 2/40; F24J 2/085; F24J 2/38; Y02E 10/46
    USPC ............ 60/641.8–641.15, 517–516; 126/600, 126/601, 605
    See application file for complete search history.

(56) References Cited

U.S. PATENT DOCUMENTS

| 5,959,787 A * | 9/1999 | Fairbanks | F24J 2/06 136/246 |
| 7,558,452 B2 | 7/2009 | Ho | |
| 8,165,435 B2 | 4/2012 | Martin-Lopez | |
| 2007/0070531 A1* | 3/2007 | Lu | F24J 2/085 359/851 |
| 2008/0092877 A1* | 4/2008 | Monsebroten | F21S 11/00 126/683 |
| 2009/0223555 A1* | 9/2009 | Ammar | H01L 31/052 136/246 |
| 2010/0186794 A1* | 7/2010 | Chen | F03G 6/001 136/206 |
| 2013/0139805 A1 | 6/2013 | Peris Domingo et al. | |

OTHER PUBLICATIONS

Solar-Driven Parabolic Dish Farm Opens, Solar Power Engineering, Jan. 23, 2010.
How Do Solar Parabolic Dishes Work?, Solar Power Engineering, Jan. 23, 2010.

* cited by examiner

*Primary Examiner* — Hoang Nguyen
(74) *Attorney, Agent, or Firm* — William E. Hein (57) ABSTRACT

A solar energy collector utilizes one or more Fresnel lenses supported above a prepared surface for focusing sunlight at one or more sun ray spots. One or more tracking tables sense and track, during the course of the day, the movement of associated ones of the sun ray spots. Curved Fresnel lenses produce sun ray spots focused an offset distance above associated ones of one or more tracking tables, depending upon the sun's position. The sun ray spots may be forced to lie on the one or more tracking tables by moving an associated tracking table upward a distance equal to the offset distance. One or more wheel-equipped Stirling engines are positioned on the prepared surface and are conventionally controlled for tracking movement in concert with an associated sun ray spot.

13 Claims, 10 Drawing Sheets

SOLAR ENERGY COLLECTOR WITH XY OR XYZ SUN TRACKING TABLE

BACKGROUND AND SUMMARY OF THE INVENTION

This invention relates generally to solar energy collectors and, more particularly, to a sun tracking table that improves their operating efficiency.

Numerous devices for harnessing the sun's energy are described in the prior art. U.S. Pat. Nos. 7,558,452 and 8,165,435 are directed to solar energy collectors that employ domed structures and fiber optics, but neither teaches tracking the sun's position as it changes throughout the day. Some prior art solar energy collectors teach tracking the sun by rotating collector mirrors and adjusting associated angles such as azimuth. Prior art industrial solar collectors that employ photo voltaic (PV) solar cells utilize complex three-dimensional mechanisms to move the entire PV panel in order to track the sun. Concentrated Solar Power (CSP) farms that employ concentrators utilizing mirrors or parabolic lenses occupy large areas of land on the order of a square mile Prior art CSP collectors of the type manufactured by Stirling Energy Systems under the product name SunCatcher that employ mirrors to concentrate the sun's rays require three-dimensional controlled movement of the entire collector array in order to track the sun. These prior art mirror collectors must be very sturdily constructed in order to handle the torsional forces resulting from mounting the heavy Stirling engine at the focal point of the mirror-covered parabolic dish. Considerable energy is wasted by the sun tracking mechanisms utilized to move these bulky prior art dishes over their full range of motion, thus reducing overall operating efficiency. Furthermore, sufficient space must be provided adjacent each collector array to prevent mechanical interference with other arrays within a CSP farm. This unused space further reduces the overall efficiency of the prior art CSP farms.

It would be advantageous to provide a solar energy collector utilizing one or more Fresnel lenses formed in a chosen geometric shape for focusing solar energy as one or more sun ray spots.

It would be further advantageous to provide a solar energy collector having a tracking table for tracking the movement of a sun ray spot impinging thereon.

It would be further advantageous to provide a solar energy collector having a wheel-equipped Stirling engine positioned on a flat or otherwise prepared surface to facilitate easy movement, controlled by a tracking table positioned proximate the flat surface, in concert with a moving sun ray spot impinging on a heat element of the Stirling engine.

These and other advantages are accomplished in accordance with the illustrated preferred embodiments of the present invention described below that serve to minimize the structural and operating costs associated with prior art solar energy concentrators that have enjoyed widespread commercial use in CSP farms.

DETAILED DESCRIPTION OF THE PREFERRED EMBODIMENT

It is well understood in the solar energy collection industry that approximately one kilowatt of solar power can be collected on a surface having an area of one square meter. Assuming an operating efficiency of approximately 25%, approximately four kilowatts of power can be collected on a surface having an area of four square meters. That collection area and associated power generation capability are compatible with the requirements of the average homeowner.

Figure 1:
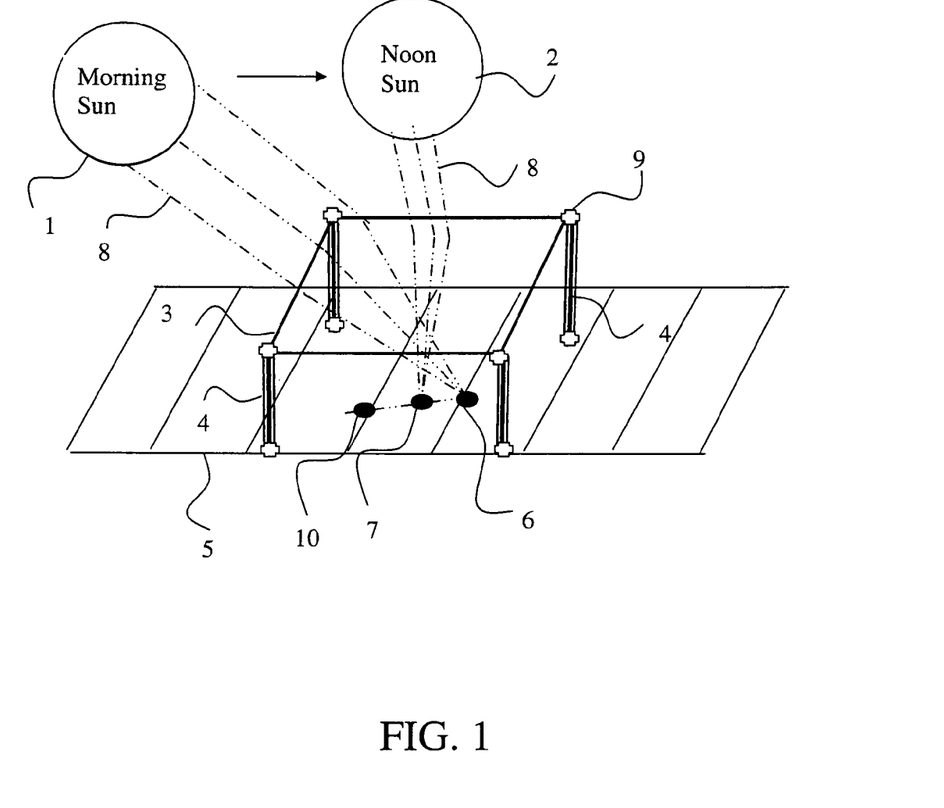
FIG. 1 is a pictorial diagram illustrating a solar energy collector in accordance with the present invention in which a Fresnel lens of square shape is utilized for collecting solar energy on a flat or otherwise prepared surface.

The solar energy collector of the present invention utilizes Fresnel lenses for concentrating sunlight onto a collection surface. Fundamentally, various shapes and sizes of Fresnel lenses may be utilized. For example, the rectangular Fresnel lens 3, illustrated in FIG. 1, will work well once the sun has risen to position 1 that is approximately 30° above the eastern horizon. When the sun is in morning position 1, lens 3 will focus the sun's rays 8 at a sun ray spot 6 on a flat or otherwise prepared surface 5. A plurality of vertical corner support members 4, together with a like plurality of joining members 9 attached thereto, serve to hold lens 3 in place above surface 5 at a particular distance that is equal to or otherwise related to the focal length of lens 3. When the sun has moved from morning position 1 to noon position 2, sun rays 8 will be focused at sun ray spot 7 on focal plane surface 5. Similarly, as the day progresses, the positions of the sun ray spots on focal plane surface 5 at which rays 8 are focused will progressively move to sun ray spot position 10 and beyond in an easterly direction opposite the sun's movement. Instead of being rectangular as illustrated in FIG. 1, Fresnel lens 3 may be a convex curved shape, which will perform better by narrowing the area onto which the sun's rays 8 are concentrated. That is because the curved shape of Fresnel lens 3 will force the sun ray spot on surface 5 at which the sun's rays 8 are focused to move less in the XY direction in response to movement of the sun, when compared to the flat square shape of Fresnel lens 3 illustrated in FIG. 1.

Figure 2:
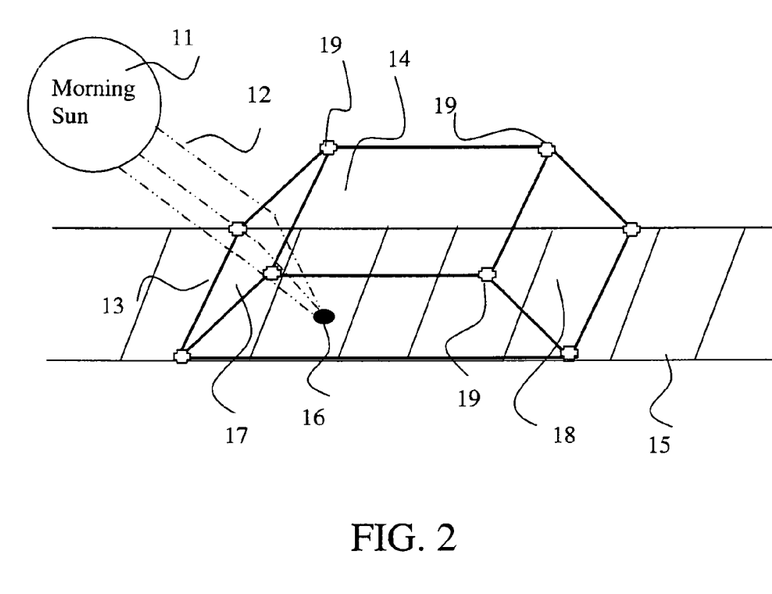
FIG. 2 is a pictorial diagram illustrating a solar energy collector in accordance with the present invention that employs a polyhedron structure having Fresnel lens panels capable of collecting morning and afternoon solar energy when the sun is at a low angle with respect to the horizon.

Referring now to FIG. 2, there is shown a polyhedron Fresnel lens structure 13 that includes east-facing and west-facing sloping Fresnel lenses 17, 18 that are attached to and support the east and west ends of a rectangular top Fresnel lens 14, utilizing a plurality of joining members 19 to focus the early morning and late afternoon sun rays 12 onto surface 15. As illustrated in FIG. 2, the early morning sun rays 12 are focused by Fresnel lens 17 at a sun ray spot 16 on surface 15, thus improving solar energy collection over the simple rectangular lens structure of FIG. 1. Solar energy collection in the late afternoon is similarly improved by utilizing Fresnel lens 18 that is sloped opposite to Fresnel lens 17.

Figure 3:
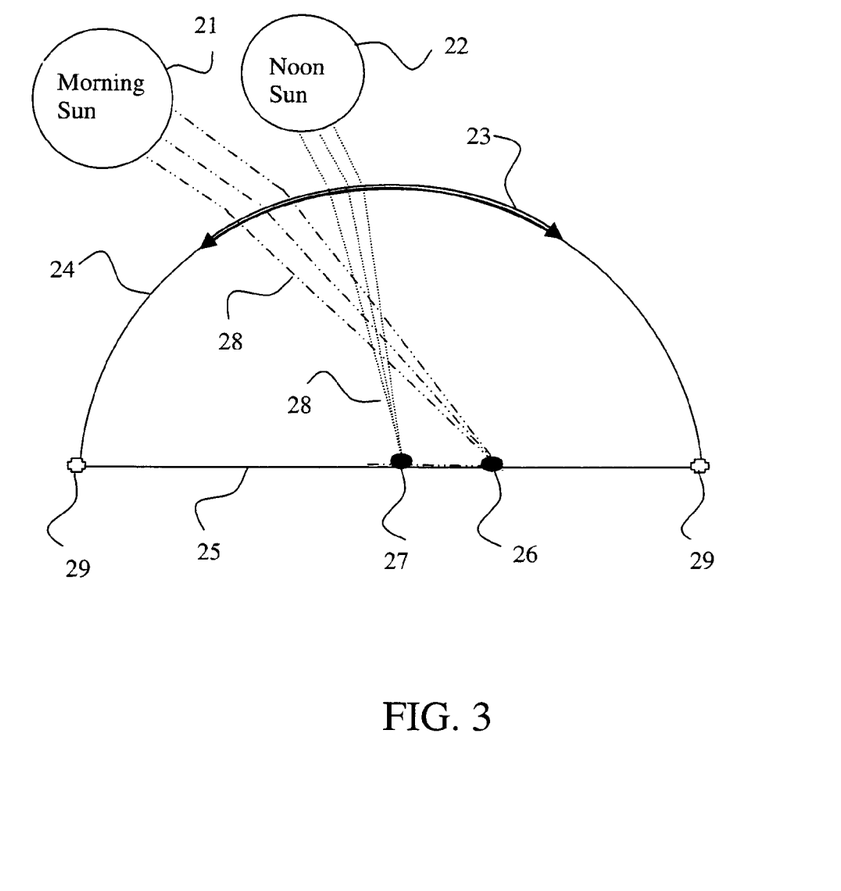
FIG. 3 is a pictorial diagram illustrating a domed solar energy collector in accordance with the present invention that focuses solar energy at various spots on a focal plane of the solar energy collector, depending on the position of the sun.

Referring now to FIG. 3, there is shown a solar energy collector having a dome 24 partially covered by a correspondingly-shaped Fresnel lens 23. Alternatively, dome 24 and Fresnel lens 23 may be the same structure. Dome 24, which is held in place by joining members 29, is placed over a surface 25 that extends diametrically across dome 24 such that the focal point of Fresnel lens 23 lies on surface 25. As illustrated, rays 28 collected when the sun is in positions 21, 22 are respectively focused at sun ray spots 26, 27 on surface 25.

Figure 4:
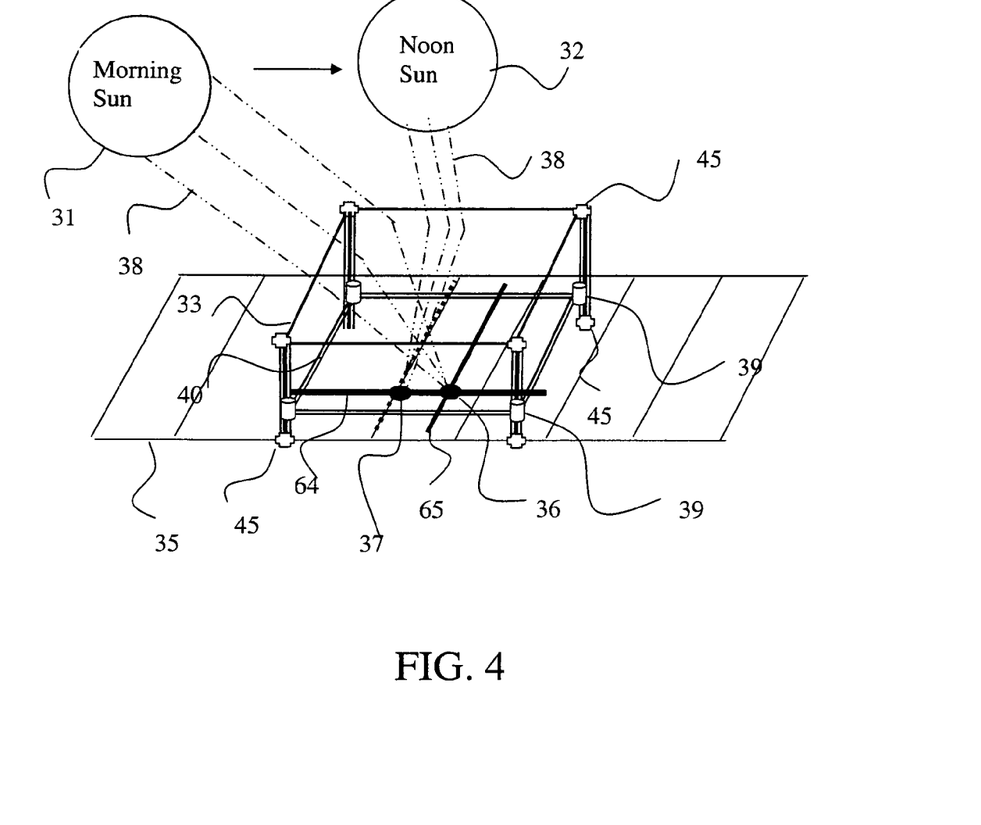
FIG. 4 is a pictorial diagram of the square Fresnel lens of FIG. 1 with the addition of a two-dimensional XY tracking table positioned above the flat or otherwise prepared surface for tracking the position of the sun.

Referring now to FIG. 4, there is shown a rectangular Fresnel lens 33, like rectangular Fresnel lens 3, illustrated in FIG. 1, to which a two-dimensional XY tracking table 40 has been placed over a surface 35 for tracking movement of the sun over the course of a day, from its morning position 31 when rays 38 are focused at sun ray spot 36, which is a point in space above surface 35, to its noon position 32 when rays 38 are focused at sun ray spot 37, and beyond. XY tracking table 40 is held in place below Fresnel lens 33 at a distance equal to or otherwise related to the focal length thereof by a plurality of vertical corner support members 39 and a plurality of joining members 45. XY tracking table 40 may comprise any of a number of such tables that are commercially available and that include an X arm 64 and a Y arm 65 arranged for rectilinear motion. X and Y arms 64, 65 may be controlled manually or by means of conventional computer-programmed servo motors. Heat from the sun may be utilized to align the solar collection system for tracking purposes in correspondence with an initial position of the sun. The tracking system of the present invention, in which an XY tracking table moves to track the sun's position, eliminates the prior art requirement for moving the entire solar collector, including a typically massive mirror assembly, to track the sun's position.

Figure 5:
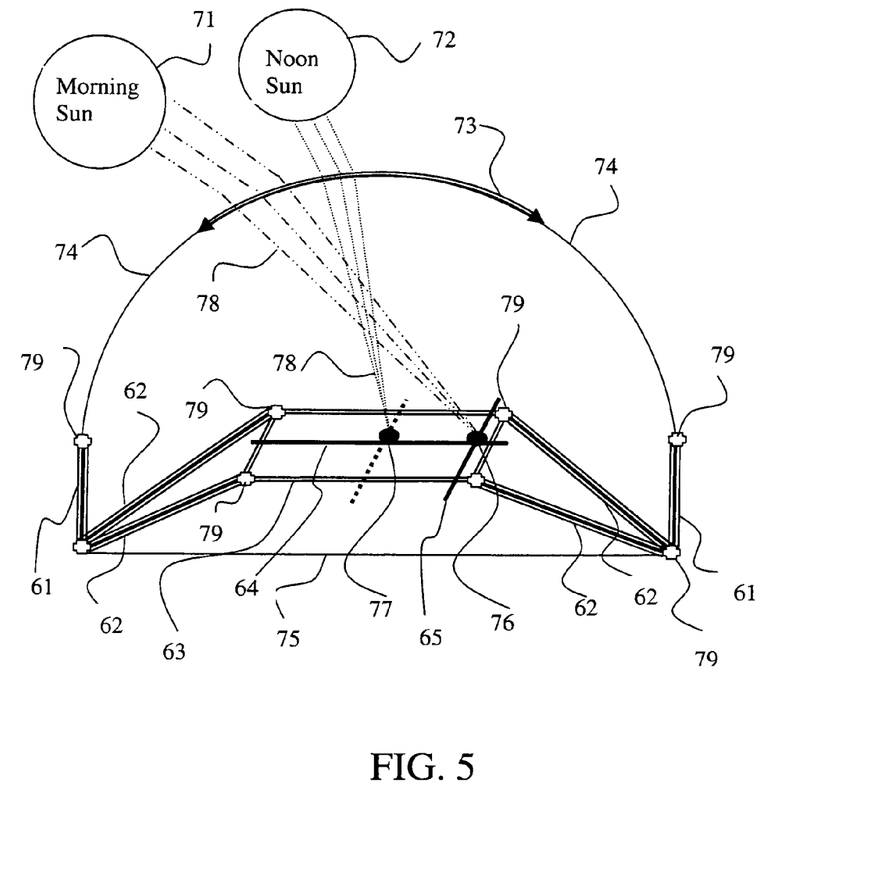
FIG. 5 is a pictorial diagram illustrating a domed solar energy collector like that of FIG. 3 in which a two-dimensional XY tracking table is positioned above the focal plane of the solar energy collector.

Referring now to FIG. 5, there is shown a solar energy collector having a dome 74 that is partially or completely covered by a correspondingly-shaped Fresnel lens 73, like that illustrated in FIG. 3. A plurality of vertical frame members 61 and angled frame members 62 are positioned on a surface 75 over which dome 74 is placed. Frame members 61, 62 are connected to dome 74 for the purpose of supporting a rectangular XY tracking table frame 63 above surface 75 at a distance related to the focal length of Fresnel lens 73. Like XY tracking table 40 illustrated in FIG. 4, X arm 64 and Y arm 65 are arranged for movement within tracking table frame 63 to track the sun's position. Frame members 61, 62, dome 74, and table frame 63 are interconnected, as illustrated, by a plurality of joining members 79. When the sun is in the morning position 71, its rays 78 are focused at sun ray spot 76, on XY tracking table frame 63, that is associated with the illustrated positions of X arm 64 and Y arm 65. When the sun is in midday position 72, its rays 78 are focused at sun ray spot 77 associated with the illustrated new positions of X arm 64 and Y arm 65.

Figure 6:
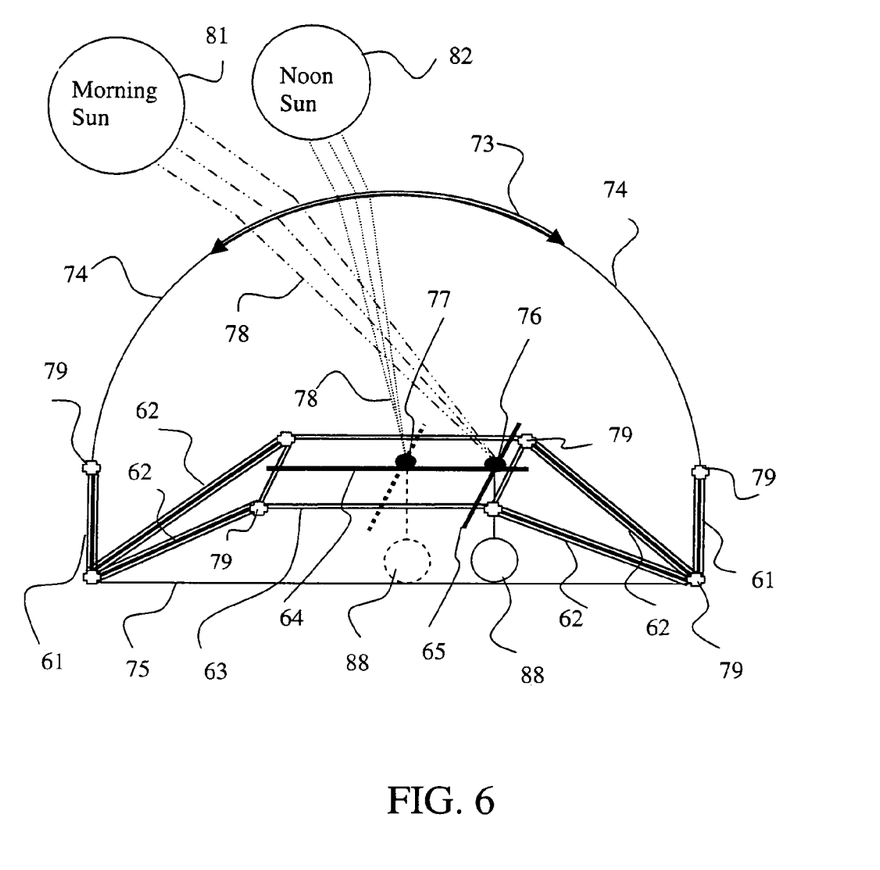
FIG. 6 is a pictorial diagram illustrating the addition of a Stirling engine to the domed solar energy collector of FIG. 5.
Figure 7:
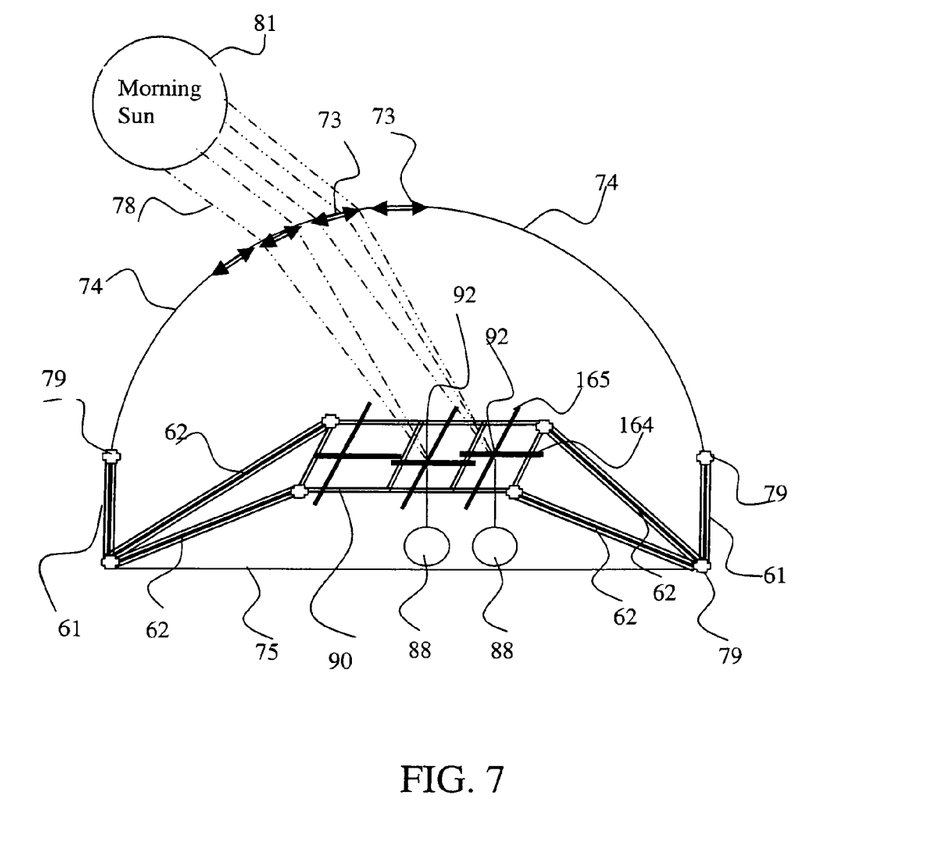
FIG. 7 is a pictorial diagram of a domed solar energy collector of the type illustrated in FIGS. 5 and 6 in which multiple flat Fresnel lenses are mounted on the dome and in which the multiple Fresnel lenses focus solar energy at multiple spots on the XY tracking table at any given position of the sun.

Referring now to FIG. 6, there is shown the solar energy collector of FIG. 5 with the addition of a conventional Stirling engine which converts the heat energy resulting from collected solar energy to mechanical energy and then to electrical energy. Stirling engine 88 is attached to XY tracking table frame 63 for utilizing the heat concentrated at the sun ray spots on XY tracking table frame 63 produced by the sun's rays as its movement is tracked throughout the day from the morning position 81 to the noon position 82 and beyond. Stirling engine 88 includes wheels that move along surface 75 to follow movement of the sun ray spots impinging on tracking table frame 63. In accordance with the prior art, a heavy prior art Stirling engine is mounted in a fixed position, with a flexible heat conductor serving to convey heat produced by the solar energy collector to the Stirling engine itself. Stirling engine 88 of FIG. 6 includes wheels that greatly improve the efficiency of the present invention by facilitating easy movement along surface 75 in concert with movement of the sun ray spots impinging on tracking table frame 63. Furthermore, tracking table frame 63, with X arm 64 and Y arm 65 can be positioned on the surface 75 beneath the wheels of Stirling engine 88 such that the sun ray spot 76 will impinge directly on a heat element located at the top of Stirling engine 88 while the wheels of Stirling engine 88 will respond to tracking table frame 63 to move Stirling engine 88 away from sun ray spot 76 toward sun ray spot 77. It will be recognized that as Fresnel lens 73 is increased in size, the larger collection area will produce a greater amount of solar energy. However, the cost of producing a very large Fresnel lens 73 may dictate the use of a multiplicity of smaller, standard size Fresnel lenses 73 to cover dome 74. In this case, as illustrated in FIG. 7, the multiplicity of smaller Fresnel lenses 73, having long focal lengths in comparison to their physical dimensions, will generate multiple sun ray spots 92 on the focal plane of dome 74, which is coincident with the XY tracking table frame 90. It is possible to generate a number of concentrated sun ray spots on the focal plane of dome 74 nearly equal to the number of Fresnel lenses 73.

The use of multiple Fresnel lenses 73 to cover dome 74 produces multiple sun ray spots 92 on the focal plane of dome 74 for a given sun position, such as morning sun position 81, illustrated in FIG. 7. Since each of the Fresnel lenses 73 is small in comparison to dome 74, the total solar energy collected in the aggregate at sun ray spots 92 may be nearly equal to the solar energy collected by a single large Fresnel lens covering dome 74. As also illustrated in FIG. 7, the use of multiple small Fresnel lenses 73 requires a matrix of secondary XY tracking tables within primary XY tracking table frame 90. As in the single XY tracking table structure of FIG. 5, a plurality of vertical and angled frame members 61, 62 are positioned on a surface 75 over which dome 74 is placed. As also depicted in FIG. 5, frame members 61, 62 are connected to dome 74 by means of joining members 79 for the purpose of supporting rectangular XY tracking frame 90 above surface 75 at a distance equal to or otherwise related to the focal length of the Fresnel lenses 73. Like XY tracking table 40 illustrated in FIG. 4, X arm 164 and Y arm 165 are arranged for movement within XY tracking frame 90 to track the sun's position. A Stirling engine 88, like that illustrated and described in connection with FIG. 6, is assigned to each one of the matrix of secondary XY tracking tables within the primary XY tracking frame 90 to follow the sun ray spot 92 corresponding to that engine's associated secondary XY tracking table. The heat element of each Stirling engine 88 is located at a sun ray spot 92 to maximize the solar energy harvested thereby.

Figure 8:
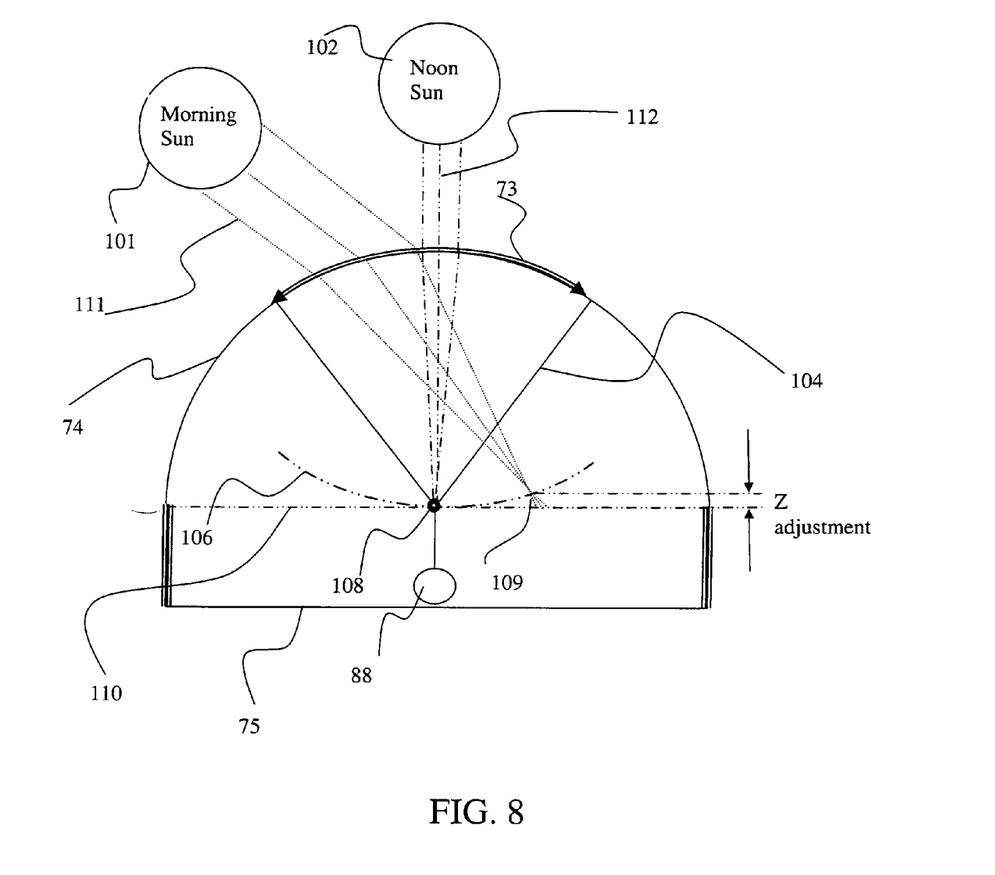
FIG. 8 is a pictorial diagram of a domed solar energy collector of the type shown in FIGS. 5 and 6, illustrating how a difference in focal length resulting from different positions of the sun is corrected by movement of the two-dimensional XY tracking table upward in the Z direction.

Referring now to FIG. 8, there is shown a solar energy collector of the type illustrated in FIGS. 5-7 for powering Stirling engine 88. Dome 74, having a radius 104, is partially covered by Fresnel lens 73. In order to simplify FIG. 8, XY tracking table 63 and its associated structure depicted in FIG. 5 are not shown. It may be seen that when the sun is in the morning position 101, its rays 111 travel a longer distance than rays 112 that are produced by the sun in noon position 102 before focusing at sun ray spots 109, 108, respectively. As illustrated, sun ray spot 109 is not located on XY tracking table 63, as represented by focal plane 110, but is located, instead, on a spatial arcuate focal surface 106 a distance Z above focal plane 110. The sun ray spot 109 produced by the sun when it is in the morning position 101, as well as sun ray spots produced at other morning and afternoon positions, may be forced to lie on focal plane 110. This is accomplished by raising XY tracking table 63 of FIGS. 5 and 6 the required small distance Z to bring it into coincidence with arcuate focal surface 106 at the sun ray spots focused thereon. Movement of XY tracking table 63 of FIG. 5 in the Z direction, as described above in connection with FIG. 8, may also be utilized for the purpose of defocusing sun ray spot 109 and other sun ray spots lying on arcuate focal surface 106 in order to regulate the output of Stirling engine 88 and its associated operating temperatures.

Figure 9:
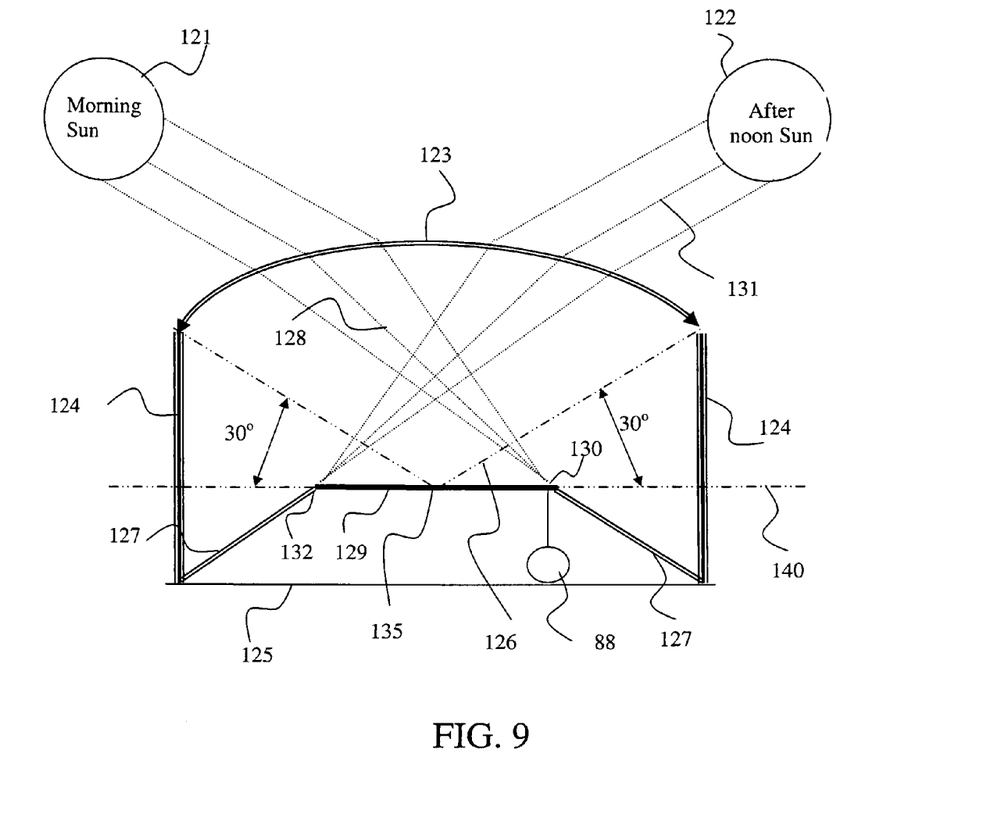
FIG. 9 is a pictorial diagram illustrating how the generally hemispherical shape of the domed solar energy collector of FIGS. 5-8 may be truncated for operation only during those times at which the sun is at a minimum angle above the east and west horizons.

The configuration of the solar energy collector of FIG. 8 may be modified as illustrated in FIG. 9 in order to reduce manufacturing costs and to account for the reduced hours of daylight during which meaningful solar energy may be collected. As stated above, the solar energy collectors of the present invention may be arranged in the form of a concentrated solar power (CSP) farm covering a typical area of one square mile. The truncated hemispherical collection dome is covered by a Fresnel lens 123 that is supported over a surface 125 by a plurality of vertical supports 124 spaced around the periphery of Fresnel lens 123. As illustrated, the height of the vertical supports 124 is selected to provide a solar collection window that extends from approximately 30° above the east horizon to approximately 30° above the west horizon, as depicted with respect to horizontal plane 140. Although this arrangement will result in limiting the hours of each day during which solar energy collection is possible, the reduced diameter of the Fresnel lens 123 will permit more compact positioning of a multiplicity of the solar energy collectors on a given area of surface 125. Moreover, the limited hours of solar energy collection should impact only those areas of earth that are far north. In most populated countries, the sun reaches a point 30° above the horizon within three hours after sunrise. The angle at which the peripheral edge of Fresnel lens 123 extends above the horizontal may, based on practical values of efficiency and solar energy collection, be made smaller or larger than the 30° angle illustrated.

The sun rays 128 produced when the sun is below morning position 121, and the sun rays 131 produced when the sun is below afternoon position 122 enter Fresnel lens 123 at such a shallow angle that they are not focused on the surface of the two-dimensional XY tracking table 129, which may comprise a three-dimensional XYZ tracking table, as described above. The diameters of Fresnel lens 123 and XY tracking table 129 are optimally selected when the sun rays 128 at about 9:00 A.M. are focused at a sun ray spot 130 that is located approximately one-fourth the diameter of the Fresnel lens 123 to the west of center point 135 of XY or XYZ tracking table 129. Likewise, at about 3 P.M., the sun rays 131 will be focused at a sun ray spot 132 that is located approximately one-fourth the diameter of the Fresnel lens 123 to the east of center point 135 of XY or XYZ tracking table 129. Given a Fresnel lens 123 having a diameter of twenty-four inches, the total sun ray spot movement will be one-half that diameter, or twelve inches. While these dimensions may be scaled up or down, as desired, the dimensions of XY or XYZ tracking table 129 are preferably equal to or slightly larger than one-half the diameter of Fresnel lens 123. As described above, Stirling engine 88 is attached to XY or XYZ table 129 for movement in concert with the sun ray spots impinging on the heat element of Stirling engine 88 as those sun ray spots progress from position 130 to position 132.

Figure 10:
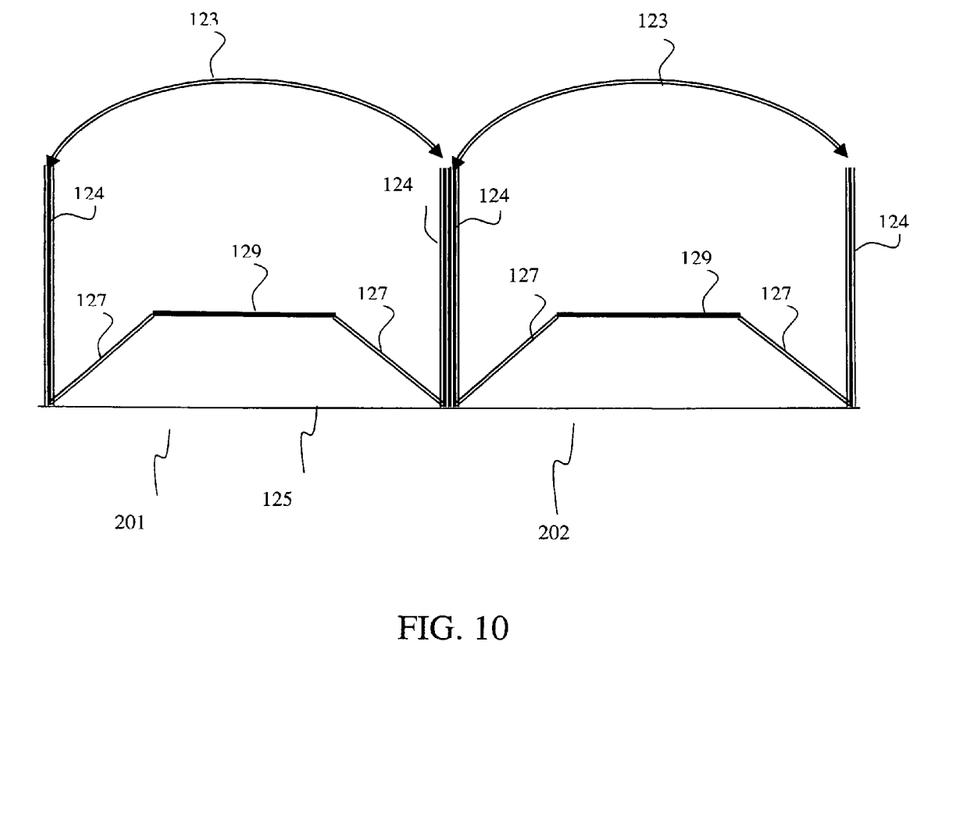
FIG. 10 is a pictorial diagram illustrating how two of the enclosed truncated domed solar energy collectors of FIG. 9 may be positioned in compact abutting relationship to each other in order to better utilize the area irradiated by the sun on one of the domed solar energy collectors.

Referring now to FIG. 10, there is shown the way in which two enclosed solar energy collectors 201, 202 constructed like that of FIG. 9 are positioned in abutting relationship to each other in a CSP farm in order to utilize the area of the CSP farm more efficiently. In the typical CSP farm, a multiplicity of the enclosed solar energy collectors 201, 201 of the present invention may be positioned in compact abutting relationship to facilitate easier maintenance access and to protect the enclosed components from exposure to the exterior elements.

I claim:

1. A solar energy collector comprising:
    a prepared surface;
    a rectangular Fresnel lens supported in a horizontal position above said prepared surface at a distance related to a focal length of said Fresnel lens, said Fresnel lens serving to focus sunlight at a sun ray spot, said sun ray spot moving from west to east as the sun moves from east to west above said Fresnel lens; and
    a two-dimensional XY tracking table positioned beneath said horizontal Fresnel lens at a distance related to the focal length thereof, said XY tracking table having an X arm and a Y arm, said X arm and said Y arm being controlled for rectilinear tracking motion such that a point of intersection of said X arm with said Y arm is maintained in a position of coincidence with said sun ray spot as it moves from west to east.

2. A solar energy collector as in claim 1, further comprising a Stirling engine positioned on said prepared surface such that said sun ray spot impinges on a heat element thereof, said Stirling engine having wheels for facilitating movement thereof across said prepared surface, said Stirling engine being controlled for movement in coincidence with said sun ray spot, said heat element of said Stirling engine being operative for collecting heat produced at said sun ray spot, for converting said collected heat to mechanical energy, and for converting said mechanical energy to electrical energy.

3. A solar energy collector as in claim 1, further comprising:
    a sloped east-facing Fresnel lens connected between an east edge of said Fresnel lens and said prepared surface, said sloped east-facing Fresnel lens serving to focus early morning sunlight at a sun ray spot; and
    a sloped west-facing Fresnel lens connected between a west edge of said Fresnel lens and said prepared surface, said sloped west-facing Fresnel lens serving to focus late afternoon sunlight at a sun ray spot.

4. A solar energy collector as in claim 3, further comprising a Stirling engine positioned on said prepared surface such that said sun ray spot impinges on a heat element thereof, said Stirling engine having wheels for facilitating movement thereof across said prepared surface, said Stirling engine being controlled for movement in coincidence with said sun ray spot, said heat element of said Stirling engine being operative for collecting heat produced at said sun ray spot, for converting said collected heat to mechanical energy, and for converting said mechanical energy to electrical energy.

5. A solar energy collector comprising:
   a prepared surface;
   a hemispherical dome structure positioned over said prepared surface such that said prepared surface extends diametrically beneath said dome structure;
   a Fresnel lens covering at least a portion of said dome structure, said Fresnel lens serving to focus sunlight at a sun ray spot, said sun ray spot moving from west to east as the sun moves from east to west above said Fresnel lens; and
   a two-dimensional XY tracking table positioned beneath said Fresnel lens at a distance related to the focal length thereof, said XY tracking table having an X arm and a Y arm, said X arm and said Y arm being controlled for rectilinear tracking motion such that a point of intersection of said X arm with said Y arm is maintained in a position of coincidence with said sun ray spot as it moves from west to east.

6. A solar energy collector as in claim 5, further comprising a Stirling engine positioned on said prepared surface such that said sun ray spot impinges on a heat element thereof, said Stirling engine having wheels for facilitating movement thereof across said prepared plane surface, said Stirling engine being controlled for movement in coincidence with said sun ray spot, said heat element of said Stirling engine being operative for collecting heat produced at said sun ray spot, for converting said collected heat to mechanical energy, and for converting said mechanical energy to electrical energy.

7. A solar energy collector as in claim 5, wherein said two-dimensional XY tracking table is operative, based upon the position of the sun, for upward movement in a Z direction a distance by which said sun ray spot is offset above said two-dimensional XY tracking table at that position of the sun.

8. A solar collector as in claim 6, wherein said two-dimensional XY tracking table is operative for moving upward in a Z direction a selected distance required to defocus said sun ray spot in order to regulate an operating temperature and output of said Stirling engine.

9. A solar energy collector comprising:
   a prepared surface;
   a hemispherical dome structure positioned over said prepared surface such that said prepared surface extends diametrically beneath said dome structure;
   a plurality of Fresnel lenses covering a portion of said dome structure, said plurality of Fresnel lenses serving to focus sunlight at multiple sun ray spots, each of said multiple sun ray spots being associated with one said plurality of Fresnel lenses, said multiple sun ray spots moving from west to east as the sun moves from east to west above said plurality of Fresnel lenses; and
   a matrix of two-dimensional XY tracking tables positioned beneath said plurality of Fresnel lenses at a distance related to the focal length thereof, each of said XY tracking tables of said matrix of XY tracking tables having an X arm and a Y arm, each X arm and Y arm being controlled for rectilinear tracking motion such that a point of intersection of associated ones of said X arms with said Y arms is maintained in a position of coincidence with an associated one of said multiple sun ray spots as it moves from west to east.

10. A solar energy collector as in claim 9, further comprising multiple Stirling engines positioned on said prepared surface, each one of said Stirling engines being associated with one of said XY tracking tables of said matrix of XY tracking tables such that said associated one of said multiple sun ray spots impinges on a heat element thereof, each of said Stirling engines having wheels for facilitating movement thereof across said prepared surface, each of said Stirling engines being controlled for movement in coincidence with said associated sun ray spot, said heat element of each of said Stirling engines being operative for collecting heat produced by said associated sun ray spot, for converting said collected heat to mechanical energy, and for converting said mechanical energy to electrical energy.

11. A solar energy collector comprising:
   a prepared surface;
   a hemispherical dome structure positioned over said prepared surface such that said prepared surface extends diametrically beneath said dome structure;
   a Stirling engine positioned on said prepared surface, said Stirling engine having a wheel mechanism for facilitating movement of said Stirling engine over said prepared surface;
   a Fresnel lens covering a portion of said dome structure, said Fresnel lens serving to focus sunlight at a sun ray spot on a heat element of said Stirling engine, said sun ray spot moving from west to east as the sun moves from east to west above said Fresnel lens; and
   a two-dimensional XY tracking table coupled to said wheel mechanism of said Stirling engine, said XY tracking table having an X arm and a Y arm, said X arm and said Y arm being controlled for rectilinear tracking motion such that a point of intersection of said X arm with said Y arm is maintained in a position of coincidence with said sun ray spot as it moves from west to east, said X arm and said Y arm controlling movement of said Stirling engine such that said heat element of said Stirling engine is positioned to be coincident with said sun ray spot at all times;
   said heat element of said Stirling engine being operative for collecting heat produced at said sun ray spot, for converting said collected heat to mechanical energy, and for converting said mechanical energy to electrical energy.

12. A solar energy collector comprising:
   a prepared surface;
   a circular dome structure positioned over said prepared surface such that said prepared surface extends diametrically beneath said dome structure, said dome structure having vertical side walls and a truncated hemispherical top member that spans the vertical side walls;
   a Fresnel lens covering said truncated hemispherical top member of said dome structure, said Fresnel lens serving to focus sunlight at a sun ray spot, said sun ray spot moving from west to east as the sun moves from east to west above said Fresnel lens; and
   a two-dimensional XY tracking table positioned beneath said Fresnel lens at a distance related to the focal length thereof, said XY tracking table having an X arm and a Y arm, said X arm and said Y arm being controlled for rectilinear tracking motion such that a point of intersection of said X arm with said Y arm is maintained in a position of coincidence with said sun ray spot as it moves from west to east.

13. A solar energy collector as in claim 12, further comprising a Stirling engine positioned on said prepared surface such that said sun ray spot impinges on a heat element thereof, said Stirling engine having wheels for facilitating movement thereof across said prepared surface, said Stirling engine being controlled for movement in coincidence with said sun ray spot, said heat element of said Stirling engine being operative for collecting heat produced at said sun ray spot, for converting said collected heat to mechanical energy, and for converting said mechanical energy to electrical energy.

* * * * *